US008425872B2

(12) United States Patent
Takhim

(10) Patent No.: US 8,425,872 B2
(45) Date of Patent: Apr. 23, 2013

(54) PROCESS FOR THE PRODUCTION OF HIGH PURITY PHOSPHORIC ACID

(75) Inventor: Mohamed Takhim, Corroy-le-grand (BE)

(73) Assignee: Ecophos S.A., Louvain-la-Neuve ( * ) Notice: Subject to any disclaimer, the term of this patent is extended or adjusted under 35 U.S.C. 154(b) by 40 days.

(21) Appl. No.: 13/124,155

(22) PCT Filed: Oct. 16, 2008

(86) PCT No.: PCT/EP2008/063969
§ 371 (c)(1),
(2), (4) Date: Apr. 14, 2011

(87) PCT Pub. No.: WO2010/043262
PCT Pub. Date: Apr. 22, 2010

(65) Prior Publication Data
US 2011/0200509 A1   Aug. 18, 2011

(51) Int. Cl.
*C01B 25/22* (2006.01)
*C01B 25/222* (2006.01)
*C01B 25/237* (2006.01)
*C01B 25/238* (2006.01)

(52) U.S. Cl.
USPC ............... 423/319; 423/321.1; 423/321.2

(58) Field of Classification Search ........ 423/317–321.2
See application file for complete search history.

(56) References Cited

U.S. PATENT DOCUMENTS

| 3,764,655 | A | | 10/1973 | Ehlers et al. | |
| 3,988,420 | A | | 10/1976 | Loewy et al. | |
| 4,105,749 | A | * | 8/1978 | Wilson et al. | 423/320 |
| 4,144,969 | A | * | 3/1979 | Snow | 209/166 |
| 2004/0013594 | A1 | * | 1/2004 | Takhim | 423/319 |
| 2005/0238558 | A1 | | 10/2005 | Takhim | |

FOREIGN PATENT DOCUMENTS

| WO | WO 2004/002888 | 1/2004 |
| WO | WO 2005/066070 | 7/2005 |

OTHER PUBLICATIONS

International Atomic Energy Agency, "The Recovery of uranium from Phosphoric Acid," 1989, INIS Clearinghouse, pp. 24-25.*

* cited by examiner

*Primary Examiner* — Steven Bos
*Assistant Examiner* — Justin Bova
(74) *Attorney, Agent, or Firm* — Christopher Casieri

(57) ABSTRACT

The invention relates to a process for the production of high purity phosphoric acid which has a very low content in antimony, and is suitable for food, pharmaceutical, or electronic industry.

28 Claims, 1 Drawing Sheet

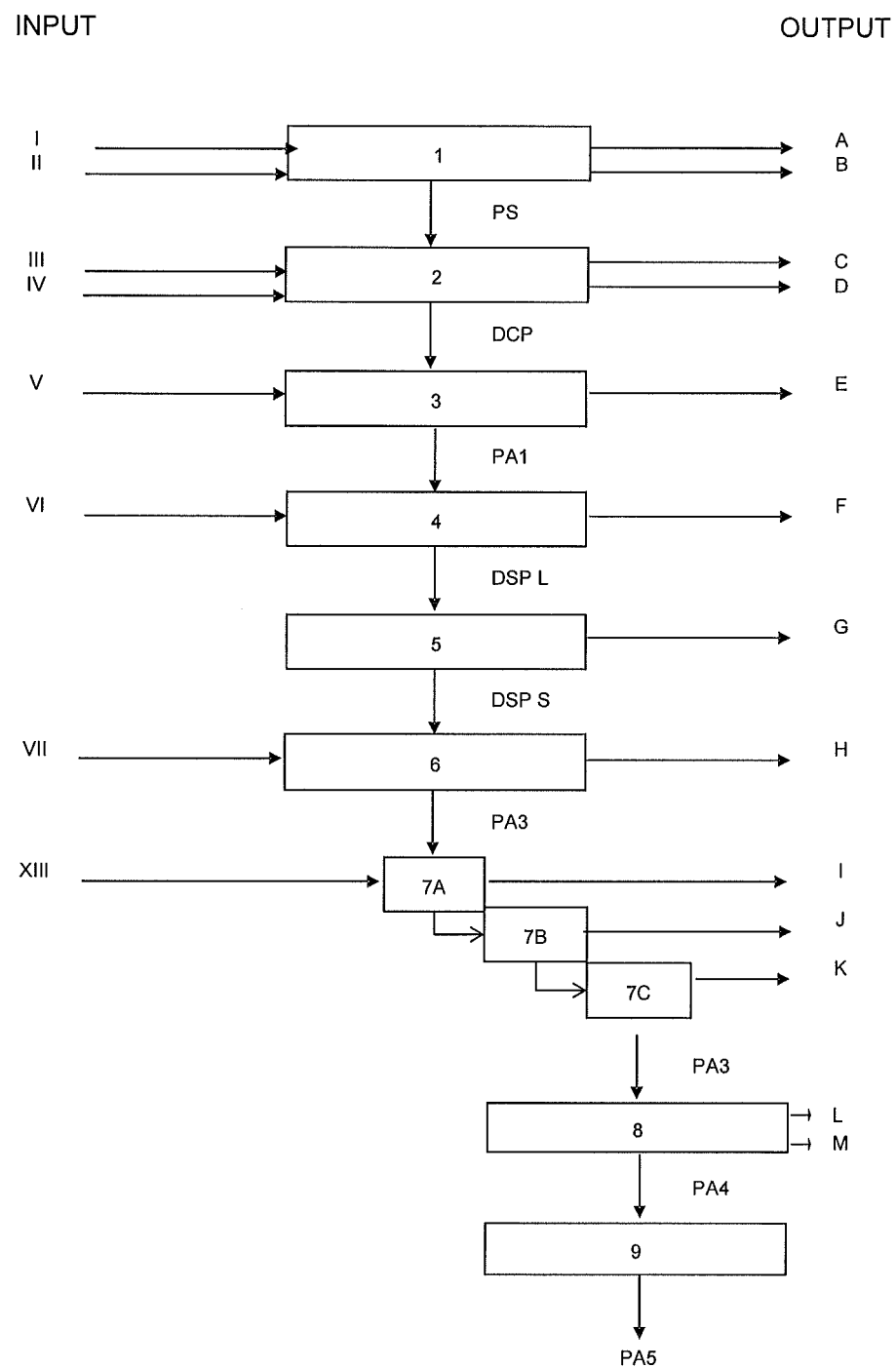

PROCESS FOR THE PRODUCTION OF HIGH PURITY PHOSPHORIC ACID

This application is a 371 application of PCT/EP2008/063969, filed Oct. 16, 2008.

TECHNICAL FIELD

The invention relates to a process for the production of phosphoric acid (PA) which may be recovered at very high purity such as electronic grade quality, food grade quality or pharmaceutical grade quality. This process produces co-products such as pure gypsum and high purity chloride salts.

DESCRIPTION OF THE STATE OF THE ART

The semiconductor industry has to avoid all kinds of influences on the behaviour of e.g. silicon substrates by the use of etching liquids. Therefore very pure chemicals, including phosphoric acid must be used in all steps of memory or processor production. Metal ions will have influence on the behaviour of a silicon substrate, because the conductivity is influenced. For instance, antimony (Sb) is used as a dopant in the production of semi-conductors and enhances the ability of a semiconductor to conduct electricity by providing selective negatively charged areas within the substrate. Antimony and its ions are known to be most difficult to remove from elemental phosphorus. (see U.S. Pat. No. 5,989,509). This problem also exists for high value phosphoric acid products such as semiconductor grade or 'electronic grade' phosphoric acid. It is further desirable to remove metal ions from phosphoric acid, in such a way that so-called 'electronic grade' phosphoric acid, is obtained.

'Electronic grade phosphoric acid' means high purity phosphoric acid having sufficient purity to be used in electronic devices manufacturing including but not limited to semi-conductors, printed circuits boards, flat screens, photovoltaic cells, and related products. For instance, the norm Semi International standards SEMI C36-0301 gives specifications for phosphoric acid grades 1, 2 and 3 which are suitable for working in the semiconductor field.

Methods for producing phosphoric acid have been known for a long time. Two types of methods are known, viz. dry methods and the wet methods. Electronic grade phosphoric acid is generally produced by dry methods based on the thermal reduction process of phosphate rock at very high temperature, which has the disadvantage to be extremely costly in energy. Some well-known wet methods involve attack of phosphate rock with acids, principally sulphuric acid, but also nitric, perchloric or hydrochloric acids. A hydrochloric attack of the phosphate rock is known for example from U.S. Pat. No. 3,304,157 and GB-1051521. These methods have the drawback that they generally use, for the attack, a concentrated solution of HCl which may be 20% or even 30% by weight. The rock to be used has to be of good quality, that is to say, amongst others, that it must have a high $P_2O_5$ content, and fine grinding of the rock is usually required, which increases the costs.

Also known is a hydrochloric etching method in which the rock is subjected to a first limited attack with diluted hydrochloric acid, a second attack with diluted hydrochloric acid and then liquid-liquid extraction to remove calcium chloride (U.S. Pat. No. 3,988,420).

It has also been known to apply a different method of producing phosphoric acid, as described in US 2005/0238558 and in U.S. Pat. No. 7,361,323, which comprises a neutralization step.

However, none of these wet processes produces electronic grade quality phosphoric acid. In view of the disadvantages of the dry methods such as for instance the high temperature, there is need for such a wet process to make high purity phosphoric acid.

We have now found that is possible to obtain, by a wet process, such an electronic grade quality phosphoric acid. In particular, we have found that it is possible to obtain very good results as far as the content in antimony is concerned.

Within the frame of this specification, phosphate values, except where otherwise indicated, will be expressed on a weight % basis and as phosphoric acid anhydride ($P_2O_5$).

SUMMARY OF THE INVENTION

The invention relates to a process for the production of high purity phosphoric acid which comprises the following successive steps:
  (a) performing an attack of a first phosphate salt with a first strong acid to form a slurry of first phosphoric acid, in solution, and a first solid phase (first part of step 3, see FIG. 1);
  (b) separating the first phosphoric acid from the first solid phase (second part of step 3, see FIG. 1);
  (c) adding of a basic compound to the first phosphoric acid to form a new slurry of a second phosphate salt, in solution, and a second solid phase containing impurities (first part of step 4, see FIG. 1);
  (d) separating the second phosphate salt from the second solid phase (second part of step 4, see FIG. 1);
  (e) performing a second attack of the second phosphate salt with a second, concentrated, strong acid to form a second phosphoric acid and a salt (first part of step 6, see FIG. 1);
  (f) separating the second liquid phosphoric acid from the salt (second part of step 6, see FIG. 1);
  (g) extracting the second phosphoric acid with an organic solvent to form an organic extraction phase containing phosphoric acid and an aqueous extraction phase containing impurities (step 7A—see FIG. 1)
  (h) re-extracting said organic extraction phase by an aqueous re-extraction agent to form an aqueous re-extraction phase and a phosphoric acid-lean organic phase (step 7B—see FIG. 1);
  (i) separating the aqueous re-extraction phase which is a third phosphoric acid and the organic phase (step 7C—see FIG. 1); and
  (j) applying ion-exchange to the third phosphoric acid to produce a high purity phosphoric acid (step 9—see FIG. 1).

The first phosphate salt may be obtained according to different process and may be bought on the market. However, in a preferred way, the process of the invention comprises, before the step (a) performing an attack of the first phosphate salt with the first strong acid, the following steps:

performing an attack of phosphate rock with a solution of hydrochloric acid to form a slurry consisting of an aqueous phase, containing, in solution, phosphate ions, chloride ions and calcium ions and an insoluble solid phase containing impurities (first part of step 1—see FIG. 1);

separating the aqueous phase, comprising, in solution, phosphate ions, chloride ions and calcium ions, and the insoluble solid phase (second part of step 1—see FIG. 1);

performing a neutralisation of the aqueous phase by addition of a calcium compound to form calcium phosphate from the phosphate ions, said calcium phosphate being insoluble in water (first part of step 2—see FIG. 1);

a separating the calcium phosphate, which may be used in the process as the first phosphate salt, and the aqueous phase containing, in solution, calcium ions and chloride ions. (second part of step 1—see FIG. 1).

In such a case, the concentration of hydrochloric acid is preferably comprised between 3 and 10% w/w, the molar ratio between HCl and Ca is comprised between 0.6 and 1.3, and the pH may be lower than 1.4

The process may further comprise performing a preliminary neutralization (not represented in FIG. 1). of the said slurry to a pH lower than the pH at which a significant part of calcium phosphate precipitates This pH is adjusted by said preliminary neutralization between 0.8 and 4, preferably, between 1.3 and 1.4. The neutralization and preliminary neutralization may be carried out with a strong base chosen in the group consisting of calcium hydroxide, calcium carbonate and mixtures thereof.

Preferably, the first phosphate salt is calcium monohydrogenophosphate (DCP). The first phosphate salt may have a $P_2O_5$ concentration of 40 to 50% w/w and a calcium concentration of 25 to 28% w/w.

The step of adding a basic compound to form a second phosphate salt, is preferably performed at a temperature between 40 and 90° C.

Preferably, the first strong acid is sulphuric acid. The molar ratio between the first strong acid and the first phosphate salt is preferably comprised between 0.6 and 1.6. More preferably, this ratio is 1.

When the first strong acid is sulphuric acid and the first phosphate salt is DCP, the first solid phase is gypsum. According to the invention, it has been possible to obtain such a co-product with a very high purity, as is described in the example below.

The first phosphoric acid obtained according to the process of the invention has preferably a $P_2O_5$ content comprised between 20 and 40% w/w.

The basic compound is preferably chosen in the group consisting of sodium carbonate, sodium hydroxide, potassium carbonate, potassium hydroxide, ammonia, ammonium hydroxide and mixtures of these compounds. It may be added to the first phosphoric acid to reach a pH between 6.0 and 10.0.

The second phosphate salt is preferably a sodium phosphate salt, preferably disodium phosphate (DSP). The second phosphate salt may have a $P_2O_5$ content comprised between 20 and 50% w/w.

The process of the invention may further comprise obtaining a crystallisation of the second phosphate salt (preferably liquid disodium phosphate—DSP I) to form a solid phosphate salt (solid disodium phosphate—DSP s) and a liquid phase containing impurities (first part of step 5—see FIG. 1);

separating the second phosphate salt, once crystallized, from the liquid phase (second part of step 5—see FIG. 1).

The temperature of said crystallization is preferably less than 40° C.

Preferably, the second strong acid is hydrochloric acid. In such a case, the chloride/sodium molar ratio is comprised between 0.8 and 1.5, more preferably 1.2; its concentration may be comprised between 25 and 40% w/w, and it may have a $P_2O_5$ content comprised between 30 and 65% w/w.

The salt is preferably chosen in the group consisting of sodium chloride, potassium chloride, ammonium chloride and mixtures thereof. Preferably, the salt is in a solid state. The salt is preferably suitable for human food or for pharmaceutical applications.

The organic solvent is preferably chosen in the group consisting of methylisobutylketone, butanol, pentanol, organic solvents in C4 to C7 and mixtures thereof.

The process of the invention may further comprise, preferably before the extraction of the organic extraction phase containing phosphoric acid, washing of the said organic extraction phase containing phosphoric acid by an aqueous solution in order to obtain a washed organic phase containing phosphoric acid and an aqueous phase containing impurities and some phosphoric acid;

separating the obtained washed organic phase containing phosphoric acid which is suitable for said re-extraction. (STEP 7 B—see FIG. 1)

It may further comprise steam entraining of traces of organic extraction agent from the said third phosphoric acid. (Step not represented in FIG. 1)

Preferably, the third phosphoric acid has a $P_2O_5$ content comprised between 10 and 50% w/w.

Preferably, the ion exchange is performed with a cation exchange resin.

In a preferred manner, the process according to the invention may further comprise concentrating the said high purity phosphoric acid.

Any liquid effluent and solid residue, containing phosphate ions, may be recycled in the process of the invention.

Preferably, the high purity phosphoric acid has a $P_2O_5$ content between 50 and 65% w/w.

BRIEF DESCRIPTION OF THE DRAWING

FIG. 1 is a block diagram representing steps 1 to 9 of a process according to the invention for producing high purity phosphoric acid.

GENERAL DESCRIPTION OF A PROCESS ACCORDING TO THE INVENTION

1. Attack of Phosphate Rock with Diluted HCl

Step 1 of the process, illustrated in FIG. 1, consists of an attack of phosphate rock with diluted HCl. For instance, phosphate rock with a $P_2O_5$ content typically between 20 and 35% $P_2O_5$ is introduced into a reactor (input I) together with an aqueous solution of HCl, diluted between 3 and 10% (input II). A residue of impurities is obtained in the form of a solid cake after liquid-solid separation (output A). Washing water is eliminated or recycled in the process (output B). The filtrate (PS) is a solution of PA, calcium chloride and mono calcium phosphate (MCP) $Ca(H_2PO_4)_2$. The pH of the solution is below 1. The pH may be increased, for instance, between 0.9 and 2.0 by addition of milk of lime and/or calcium carbonate. Said step, called pre-neutralization, is optional and not represented in FIG. 1. If pre-neutralization is applied, the purity of the obtained aqueous solution is enhanced.

2. Production of Dicalcium Phosphate (DCP)

In step 2, $CaCO_3$, and/or a solution of milk of lime $Ca(OH)_2$ are introduced, respectively inputs III and IV, thereby (further) increasing pH. The aqueous solution of phosphate reacts with calcium and water in such a way that DCP (also sometimes designated calcium monohydrogenophosphate) $CaHPO_4.2H_2O$ (DCP) precipitates. The DCP precipitation occurs for instance according to the chemical equations

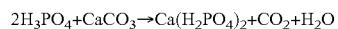

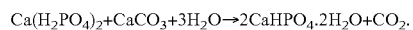

After liquid-solid separation a solid DCP is obtained and washed. An aqueous filtrate containing $CaCl_2$ is evacuated (output C) and gaseous $CO_2$ is emitted (output D). $CaCl_2$ solution may be disposed off with little harm for environment or alternatively recycled to HCl through a reaction with $H_2SO_4$ and thus recycled.

3. Production of Gypsum and Phosphoric Acid Through Attack of DCP with Sulphuric Acid In step 3, the (humid) DCP is converted to pre-purified liquid phosphoric acid PA1 by reaction with $H_2SO_4$ (input V) and calcium is removed by gypsum precipitation, according to the chemical equation $$CaH_2PO_4.2H_2O + H_2SO_4 \rightarrow CaSO_4.2H_2O + H_3PO_4 + 2H_2O.$$

A liquid-solid separation step produces liquid phosphoric acid (PA1) and solid gypsum (output E). The gypsum co-product is washed and washing water is eliminated or recycled.

The concentration at which $H_2SO_4$ attacks the DCP in the aqueous phase is preferably high, for instance of 15% $P_2O_5$, 22% $H_2SO_4$ and 63% water. It is worth noting that, according to the invention, DCP may be produced according to the steps as described above. Alternatively, one may use for the remaining steps of the process a DCP available from any source possible on the market, for instance DCP produced by the companies Decaphos, Rhodia, PotashCorp.

The phosphoric acid so produced (PA1) is submitted to an activated carbon treatment in order to eliminate organic residues, which remain adsorbed to the carbon. This treatment is optional and not represented in FIG. 1

4. Formation of Disodium Phosphate Solution ($Na_2HPO_4$) (DSP I)

In step 4, NaOH or $Na_2CO_3$, for instance are introduced (input VI). The product reacts with phosphoric acid according to one of the two equations below:

$$H_3PO_4 + 2NaOH \rightarrow Na_2HPO_4 + 2H_2O, \text{ or}$$

$$H_3PO_4 + Na_2CO_3 \rightarrow Na_2HPO_4 + H_2O + CO_2.$$

These reactions occur for instance at 60° C. Filtration of the liquid stream reveals a solid residue (output F) which is washed. Washing water is evacuated or recycled in the process. Phosphoric acid may be the phosphoric acid produced by the steps 1 to 3, or by the sulphuric attack of any other DCP or may even be any phosphoric acid available. The chemical structures of any alkaline components are very close. Therefore potassium or sodium bases can be alternatively used. It has been shown that ammonia or ammonium hydroxide may also be used.

5. Crystallisation of DSP ($Na_2HPO_4 \cdot xH_2O$)(DSP S)

In step 5, crystallisation of a solid phosphate salt is realized by cooling down the solution, for example down to 20° C., for example, according to the equation $$Na_2HPO_4(L) + xH_2O \rightarrow Na_2HPO_4 \cdot xH_2O(S)$$

DSP crystals are filtered and washed, filtrate (output G) and washing water are evacuated or recycled in the process.

6. Attack of DSP with Concentrated HCl

In step 6, the phosphate salt from the previous step reacts with highly concentrated HCl introduced (input VII), for example, according to the equation $$Na_2HPO_4 \cdot xH_2O(S) + 2HCl \rightarrow 2NaCl(S) + H_3PO_4 + xH_2O$$

Phosphoric acid is produced (PA2) as well as NaCl (output H). The NaCl produced is under the form of a solid cake. It is washed. Washing solution is evacuated or recycled in the process. The NaCl obtained by the process according to the invention is very pure (for instance food or pharmaceutical grade quality).

7. Liquid/Liquid Extraction

The liquid/liquid extraction of step 7 allows to reduce sodium and other cation traces from $H_3PO_4$ (PA2).

7A. Solvent Extraction

In solvent extraction, the aqueous phase PA2 is intensely mixed with an appropriate organic solvent (input XIII) which can be for instance Methyl Isobutyl Ketone (MIBK), butanol, pentanol or other organic solvents in the range $C_4$ to $C_7$. After stirring, the organic phase and the aqueous phase are separated. The loaded organic phase, which is the phase of interest after stirring has absorbed the phosphoric acid. The aqueous phase (raffinate: output I) can be recycled in the process.

7B. Washing of the Loaded Organic Phase

The loaded organic phase is washed by addition of washing solution in order to decrease selectively the content of ionic contaminants. The washing solution can be water or phosphoric acid. After stirring and decantation, the raffinate produced (output J) is removed and can be recycled in the process.

7C. Re-Extraction

The phosphoric acid present in the loaded organic phase is re-extracted with water. After intense stirring, the lean organic phase and the aqueous phase, containing phosphoric acid are separated. The aqueous phase is the phase of interest (PA3). The lean organic phase (output K) is recycled in step 7A as organic solvent.

8. Solvent Removal

The obtained phosphoric acid (PA3) contains traces of used solvent. Steam stripping is intended to remove traces of solvent (output L) and residual HCl (output M). The recovered solvent is recycled in step 7A.

The phosphoric acid produced (PA4) is submitted to an activated carbon treatment in order to eliminate last traces of organic residues, which remain adsorbed to the carbon. This treatment is optional.

9. Cation Exchange

The liquid phosphoric acid from the preceding step (PA4) is passed on a cation exchange resin to remove traces of metal ions.

The solution obtained is filtered to remove potential microparticles. The final product is high purity phosphoric acid electronic grade quality (PA5)

It has been shown that very good results have been obtained. This will be illustrated in the following example which is not limitative.

Example 1

1.1. Production of Phosphoric Acid from Phosphate Rock (Step 1)-1410 g of HCl 33% w/w is diluted up to 10% w/w with 3230 g of $H_2O$. The mixture is added in a reactor containing 1000 g of rock. This rock contains 29% of $P_2O_5$ and 32% of calcium. $CaCl_2$ and $H_3PO_4$ are formed. A pre-neutralization is effected in order to diminish the content of impurities. The pH is adjusted to 1.4 by adding 484 g of milk of lime $Ca(OH)_2$. Monocalcium phosphate (MCP) $Ca(H_2PO_4)_2$ is formed. The solid that contains rock residue and precipitated impurities is removed from the slurry by filtration.

(Step 2) Calcium carbonate $CaCO_3$ and milk of lime are added, thereby increasing pH. As a result, dicalcium phosphate (DCP) $CaHPO_4.2H_2O$ precipitates and $CO_2$ is emitted. In practice, 1000 g of MCP are introduced into a reactor which is heated up to 50° C. 44 g calcium carbonate are added, thereby increasing pH up to 3.0. The pH is increased up to pH 4.2 by addition of 5 g of milk of lime. The slurry is filtered on a Büchner filter. 301 g of humid DCP are recovered, 774 g of liquid residue, (mainly $CaCl_2$) are disposed off.

The humid DCP is washed with pure water. Humid DCP contains 19% of $Ca^{++}$, 29% of $P_2O_5$ and 35% of moisture.

(Step 3) 184 g $H_2O$ and 148 g $H_2SO_4$ 96% are mixed into a beaker. The mixture is heated to 60° C. 301 g of DCP are introduced in the beaker. After 30 minutes of reaction, the mixture is filtered on a Buchner filter. The gypsum $CaSO_4.2H_2O$ produced is washed with $H_2O$. Liquid phosphoric acid is produced. The gypsum obtained is of very good purity as shown in Table 1.

TABLE 1

Impurities in calcium sulfate

| Element | Content (ppm) |
|---|---|
| $P_2O_5$ | 100 |
| Al | 9.7 |
| As | <0.2 |
| B | <3 |
| Ba | 0.6 |
| Bi | <18 |
| Cd | <0.6 |
| Co | <1 |
| Cr | 1 |
| Cu | 1.2 |
| Fe | 5 |
| K | 24 |
| Mg | <1 |
| Mn | <0.6 |
| Mo | <2 |
| Ni | <5 |
| Pb | <6 |
| Sb | <0.1 |
| Se | <0.1 |
| Si | 16 |
| Sn | <7 |
| Sr | 66 |
| Ti | <2 |
| V | <3 |
| Zn | <1 |

1.2. Production of Disodium Phosphate (DSP) $Na_2HPO_4$ 1000 g of phosphoric acid of the preceding step that contains 22% $P_2O_5$ is set in a beaker. pH is adjusted to 8.0 by addition of NaOH 50%. 495 g of NaOH 50% is added in order to reach pH 8.0. The mixture is stirred for 30 minutes at 60° C. to allow complete reaction. Disodium phosphate (DSP) $Na_2HPO_4$ is obtained. A slight precipitate appears. The solution is then filtered, keeping the temperature higher than 50° C.

The solution obtained at the previous step is cooled at 20° C. while stirring. This temperature decrease leads to crystallisation of disodium phosphate. The obtained crystals are filtered on a Büchner filter and washed with cold water. 620 g of washed humid crystals with $P_2O_5$ content of 29% are obtained. The filtrate including washing water contains 10% $P_2O_5$ and can be recycled earlier in the process. Table 2 gives the contents in ppm of ions in the produced DSP. As can be seen, the results are very good.

TABLE 2

Solid disodium phosphate (DSP S) obtained after step 5 of the process (intermediate product)

| $P_2O_5$ (%) | | 29 |
|---|---|---|
| Group or element | Ions | Content ppm |
| Antimony | Sb | <0.4 |
| Arsenic | As | 0.5 |
| Ferral | Fe | 0.9 |
| | Al | 7.2 |

TABLE 2-continued

Solid disodium phosphate (DSP S) obtained after step 5 of the process (intermediate product)

| Alkali earth metals | Ca | 63 |
|---|---|---|
| | Mg | 11 |
| | Sr | <0.1 |
| Alkali metals | Na | 18581 |
| | Li | <0.2 |
| | K | 39 |
| Heavy metals | Ti | <0.1 |
| | Cr | <0.3 |
| | Co | <0.4 |
| | Ni | <0.2 |
| | Cu | <0.3 |
| | Mn | <0.1 |
| | Pb | <1.5 |
| | Zn | 1.0 |

1.3. Attack of DSP with Concentrated HCl (Step 6) 500 g of DSP crystals so produced, containing 29% of $P_2O_5$ are introduced in a beaker that contains 476 g of hydrochloric acid 37%. The molar ratio $HCl/PO_4^{3-}$ is 1.2. The mixture is stirred during 30 minutes and filtered with a Büchner. 753 g of phosphoric acid and 144 g of NaCl are obtained. Phosphoric acid solution contains 11% of $P_2O_5$. The phosphoric acid is concentrated to 47% $P_2O_5$. 334 g of phosphoric acid is obtained. Due to the concentration, NaCl continues to precipitate. 78 g of precipitated NaCl is removed by filtration and mixed with the NaCl previously obtained prior to washing it with pure water. Washing water can be recycled earlier in the process. Samples of NaCl are kept for analysis.

TABLE 3

| NaCl (% w/w) | 99.9 |
|---|---|
| Insoluble matter (%) | <0.01 |
| Ca (ppm) | 4.5 |
| Mg (ppm) | 0.22 |
| Al (ppm) | 1.0 |
| As (ppm) | <0.5 |
| Br (ppm) | <15 |
| Fe (ppm) | 3.2 |
| $SO_4^{--}$ (ppm) | 12 |
| Heavy metals (lead eq) (ppm) | <5 |
| Potassium ferro cyanide (ppm) | <10 |
| Phosphore as phosphate (ppm) | <25 |

As is apparent from the results in Table 3, the NaCl is very pure: food or pharmaceutical grade. See, for instance, Codex Standard for food grade salts, European Pharmacopoeia and Food Chemical Codex (FCC).

1.4 Liquid-Liquid Extraction (Step 7A) 200 ml (298 g) of phosphoric acid that contains 47% of $P_2O_5$ (aqueous phase) are set into a funnel. 400 ml (321 g) of Methyl Isobutyl Ketone (MIBK) is added (organic phase). The organic/aqueous ratio is 2/1. The mixture is stirred during two minutes. After stirring, the complete separation of the two phases occurs in less than two minutes. The organic phase and the aqueous phase are separated. 487 ml (462 g) of organic phase and 113 ml (156 g) of aqueous phase (raffinate) are obtained. The aqueous phase contains 40% $P_2O_5$. The raffinate can be recycled early in the process. The yield can be increased acting on the number of stages of liquid-liquid extraction.

1.5. Washing of the Organic Phase (Step 7B) The obtained organic phase is washed in order to remove ionic contaminants. 400 ml (380 g) of the organic phase is set in a funnel. 15 ml (15 g) of pure water is added. The mixture is stirred during two minutes. After stirring, the complete separation of the two phases occurs in less than one minute. The organic phase and the aqueous phase are separated. 377 ml (348 g) of organic phase and 38 ml (49 g) of aqueous phase (raffinate) are obtained. The raffinate can be recycled early in the process. The aqueous phase contains 40% $P_2O_5$.

1.6. Re-Extraction (Step 7C) The acid present in the organic phase is re-extracted. 350 ml (322 g) of the organic phase is set in a funnel. 175 ml (175 g) of pure water is added. The mixture is stirred during two minutes. After stirring, the complete separation of the two phases occurs in less than two minutes. The organic phase and the aqueous phase are separated. 332 ml (239 g) of organic phase and 235 ml (258 g) of aqueous phase are obtained. The aqueous phase is the phase of interest. It contains 15% of $P_2O_5$ and 4.3 g of total organic carbon (TOC) per l of aqueous phase.

1.7. Steam Stripping and Activated Carbon Treatment (Step 8) 250 g of the so-obtained phosphoric acid is mixed with 5 g of powdered activated carbon Norit SX1 in order to remove traces of MIBK. The mixture is stirred for 30 minutes prior to filtration. Total organic content TOC is then of 0.16 g/l. The residual organic solvent as well as traces of hydrochloric acid are then removed by steam stripping. In practice, 250 g of the phosphoric acid obtained in the previous step that contains 1.8% of chloride is concentrated up to 62% of $P_2O_5$ by vacuum evaporation. 60 g of concentrated phosphoric acid is obtained. 180 g of pure water is added dropwise in the vacuum evaporator during evaporation. The concentration of $P_2O_5$ is kept higher than 60% during this step. 60 g of acid concentrated at 62% are obtained. The residual total organic carbon (TOC) of this acid is 0.011 g/l of phosphoric acid, chloride content is inferior to 21 ppm.

1.8 Ion Exchange (Step 9) 60 g of acid obtained from the previous step are diluted to 20% of $P_2O_5$ with pure water. 186 g are obtained. This diluted acid is passed on a column packed with 80 g of cation exchange resin Amberlite UP252 (Rohm and Haas). 180 g of phosphoric acid are obtained.

1.9 Filtration

The solution obtained is filtered on a 0.45 μm PTFE membrane (Millipore Corp.) in order to remove potential particles. The so-obtained acid is then concentrated to 62% $P_2O_5$ by vacuum evaporation.

1.10 Results

This product is analyzed by ICP-MS. Results are given in Table 4. As can be seen from this table, wherein the content in contaminants is indicated in ppm, the results obtained are remarkable as far as the contents in metallic cations and anions in the products is concerned. In particular, the results are remarkable for antimony, which is difficult to remove from phosphoric acid. Results obtained shows that, at least the specifications SEMI grade 1 are reached for all elements.

Other steps well known to the person skilled in the art and not represented in the FIGURE may be adopted, such as for instance a treatment with $H_2O_2$, a purification by resin for anion exchange.

TABLE 4

| Group | Ions | Semi Grade 1 specifications | Phosphoric acid high purity PA 5 |
|---|---|---|---|
| $P_2O_5$ (%) | | 62-63 | 62% |
| Contaminants (ppm) | | | |
| Antimony | Sb | 10 | <0.05 |
| Arsenic | As | 0.05 | <0.03 |
| Ferral | Fe | 2 | <1 |
| | Al | 0.5 | 0.12 |

TABLE 4-continued

| Group | Ions | Semi Grade 1 specifications | Phosphoric acid high purity PA 5 |
|---|---|---|---|
| Alkali earth metals | Ca | 1.5 | 0.19 |
| | Mg | 0.2 | <0.1 |
| | Sr | 0.1 | <0.05 |
| Alkali metals | Na | 2.5 | <1 |
| | Li | 0.1 | <0.05 |
| | K | 1.5 | <0.5 |
| Heavy metals | Ti | 0.3 | <0.05 |
| | Cr | 0.2 | <0.05 |
| | Co | 0.05 | <0.05 |
| | Ni | 0.2 | <0.05 |
| | Cu | 0.05 | <0.05 |
| | Mn | 0.1 | <0.05 |
| | Pb | 0.3 | <0.05 |
| | Zn | 2 | ≦0.1 |
| Anions | Cl | 1 | <1 |
| | $NO_3^-$ | 5 | 2 |
| | $SO_4^{--}$ | 12 | 3 |

The invention claimed is:

1. Process for the production of high purity phosphoric acid which comprises the steps of:
   (a) performing an attack of phosphate rock with a solution of hydrochloric acid to form a slurry comprising 1) an aqueous phase, containing in solution, phosphate ions, chloride ions and calcium ions and 2) an insoluble solid phase containing impurities;
   (b) separating the aqueous phase, comprising, in solution, phosphate ions, chloride ions and calcium ions, and the insoluble solid phase;
   (c) performing a neutralization of the aqueous phase by addition of a calcium compound to form calcium phosphate from the phosphate ions, said calcium phosphate being insoluble in water;
   (d) separating the calcium phosphate, which may be used in the process as a first phosphate salt, and the aqueous phase containing, in solution, calcium ions and chloride ions;
   (e) performing an attack of a first phosphate salt with a first strong acid to form a slurry of first phosphoric acid, in solution, and a first solid phase;
   (f) separating the first phosphoric acid from the first solid phase;
   (g) adding a basic compound to the first phosphoric acid to form a new slurry of a second phosphate salt, in solution, and a second solid phase containing impurities;
   (h) separating the second phosphate salt from the second solid phase;
   (i) performing a second attack of the second phosphate salt with a second, concentrated, strong acid to form a second phosphoric acid and a salt;
   (j) separating the second phosphoric acid from the salt;
   (k) extracting the second phosphoric acid with an organic solvent to form an organic extraction phase containing phosphoric acid and an aqueous extraction phase containing impurities;
   (l) re-extracting said organic extraction phase by an aqueous re-extraction agent to form an aqueous re-extraction phase and a phosphoric acid-lean organic phase;
   (m) separating the aqueous re-extraction phase which contains a third phosphoric acid and the organic phase; and
   (n) applying ion-exchange to the third phosphoric acid to produce a high purity phosphoric acid.

2. Process according to claim 1, characterized in that the first phosphate salt is calcium monohydrogenophosphate (DCP).

3. Process according to claim 1, characterized in that the first phosphate salt has a $P_2O_5$ concentration of 40 to 50% w/w and a calcium concentration of 25 to 28% w/w.

4. Process according to claim 1, characterized in that the step of adding a basic compound to form a new slurry comprising a second phosphate salt, is performed at a temperature between 40 and 90° C.

5. Process according to claim 1, characterized in that the first strong acid is sulphuric acid.

6. Process according to claim 1, characterized in that the molar ratio between the first strong acid and the first phosphate salt is between 0.6 and 1.6.

7. Process according to claim 1, characterized in that the first solid phase is gypsum.

8. Process according to claim 1, characterized in that the first phosphoric acid has a $P_2O_5$ content comprised between 20 and 40% w/w.

9. Process according to claim 1, characterized in that the basic compound is chosen from the group consisting of sodium carbonate, sodium hydroxide, potassium carbonate, potassium hydroxide, ammonia, ammonium hydroxide and mixtures of these compounds.

10. Process according to claim 1, characterized in that the basic compound is added to the first phosphoric acid to reach a pH between 6.0 and 10.0.

11. Process according to claim 1, characterized in that the second phosphate salt is a sodium phosphate salt.

12. Process according to claim 11, characterized in that the second phosphate salt is disodium phosphate.

13. Process according to claim 1, characterized in that the second phosphate salt has a $P_2O_5$ content between 20 and 50% w/w.

14. Process according to claim 1, characterized in that it further comprises the steps of
obtaining a crystallisation of the second phosphate salt to form a solid phosphate salt and a liquid phase containing impurities; and
separating the second phosphate salt, once crystallized, from the liquid phase.

15. Process according to claim 14, characterized in that the temperature of said crystallization is less than 40° C.

16. Process according to claim 1, characterized in that the second strong acid is hydrochloric acid.

17. Process according to claim 1, characterized in that the concentration of the second strong acid is between 25 and 40% w/w.

18. Process according to claim 1, characterized in that the second phosphoric acid has a $P_2O_5$ content between 30 and 65% w/w.

19. Process according to claim 1, characterized in that the salt is chosen from the group consisting of sodium chloride, potassium chloride, ammonium chloride and mixtures thereof.

20. Process according to claim 1, characterized in that the salt is in a solid state.

21. Process according to claim 1, characterized in that the organic solvent is chosen from the group consisting of methylisobutylketone, butanol, pentanol, organic solvents in C4 to C7 and mixtures thereof.

22. Process according to claim 1, further comprising the steps of
washing the said organic extraction phase containing phosphoric acid by an aqueous solution in order to obtain a washed organic phase containing phosphoric acid and an aqueous phase containing impurities and some phosphoric acid; and
separating the obtained washed organic phase containing phosphoric acid which is suitable for said re-extraction.

23. Process according to claim 1, further comprising the step of steam entraining traces of organic extraction phase from the said third phosphoric acid.

24. Process according to claim 1, characterized in that the third phosphoric acid has a $P_2O_5$ content between 10 and 50% w/w.

25. Process according to claim 1, characterized in that the ion exchange is performed with a cation exchange resin.

26. Process according to claim 1, further comprising the step of concentrating of the said high purity phosphoric acid.

27. Process according to claim 1, characterized in that any liquid effluent and solid residue containing phosphate ions may be recycled in the said process.

28. Process according to claim 1, characterized in that the high purity phosphoric acid has a $P_2O_5$ content between 50 and 65% w/w.

* * * * *